United States Patent [19]
Weston

[11] 3,863,947
[45] Feb. 4, 1975

[54] VEHICLE STEERING STABILIZER

[75] Inventor: Orville O. Weston, Cudahy, Calif.

[73] Assignee: Highway Safety Accesories Company, Inc., Bell, Calif.

[22] Filed: Oct. 9, 1973

[21] Appl. No.: 404,412

[52] U.S. Cl................................ 280/90, 188/280
[51] Int. Cl.............................................. B62d 7/00
[58] Field of Search ...... 280/90; 188/280, 281, 282, 188/279, 278

[56] References Cited
UNITED STATES PATENTS

| | | |
|---|---|---|
| 1,949,585 | 3/1934 | Smeltz et al. ..................... 280/90 X |
| 1,958,810 | 5/1934 | Berg....................................... 280/90 |
| 2,058,384 | 10/1936 | MacLellan............................ 188/280 |
| 2,261,155 | 11/1941 | Hedrick................................. 280/90 |
| 3,627,346 | 12/1971 | Dorner et al. ........................ 280/90 |

Primary Examiner—Kenneth H. Betts
Attorney, Agent, or Firm—Pastoriza & Kelly

[57] ABSTRACT

A cylinder filled with liquid has a shaft passing entirely through the cylinder to extend from either end in sealing relationship. One extending end of the shaft is secured to a steering tie rod and the other to the axle of a vehicle so that steering of the wheels results in relative movement between the shaft and cylinder. First and second pistons are mounted on the central portion of the shaft within the cylinder, the arrangement being such that liquid can bypass the pistons when they are in a first position. In the event of a sudden shock on the steering wheels such as in striking a curb, the resulting accelerated relative movement between the shaft and cylinder causes the pistons to move together in a manner to block liquid flow from one side to the other to thereby hold the shaft in its last axial position until the shock is abated and thus stabilize the steering.

5 Claims, 7 Drawing Figures

VEHICLE STEERING STABILIZER

This invention relates to an improved steering stabilizer for preventing unintended shocks on vehicle steering wheels from throwing the wheels in one direction or the other.

BACKGROUND OF THE INVENTION

Steering stabilizing devices for preventing loss of control of steering of a vehicle because of unexpected impact on the vehicle wheels are well known in the art. An example of one such device is shown in the Hendrick et al., U.S. Pat. No. 2,151,850. Essentially, the device comprises a liquid filled cylinder with a piston and piston rod extending from one end. The piston rod is connected to the steering tie rod of the vehicle and the cylinder itself anchored to the vehicle frame such as the axle. The arrangement is such that steering movements cause the piston rod and piston to move in the cylinder, the liquid in the cylinder bypassing the piston so that normal steering can take place. On the other hand, if the wheels are subject to an unexpected impact or shock such as would be the case if they struck a large rock or a curbing, the flow of liquid past the piston is cut-off to thereby "lock" the steering tie rod relative to the frame and thus maintain the wheels in a stable position. The "locking" is only momentary and after the shock has discontinued, normal steering can resume unless the wheels are subsequently subjected to further shocks.

BRIEF DESCRIPTION OF THE PRESENT INVENTION

The present invention is concerned with a vastly improved steering stabilizer operating along similar principles to the prior art devices described above but incorporating improved structural features which render the device more reliable and longer lived.

More particularly, rather than a single piston rod and piston within a liquid filled cylinder with the piston rod extending from one end, the present invention contemplates a liquid filled cylinder with a shaft means corresponding to a piston rod passing entirely through the cylinder to extend from either end in sealing relationship. The shaft itself includes a central reduced diameter portion defining opposing first and second annular shoulders between which are mounted a split piston arrangement forming first and second pistons. Limited axial movement is possible between the pistons the same including passage means so designed that when the pistons are in a first position separated and seated against the opposed annular shoulders, liquid can easily pass from one side of the pistons to the other. On the other hand, should a sudden shock wave be generated in the liquid as a consequence of accelerated movement of the shaft means exceeding a given value, the first and second pistons come into engagement with each other in a second position to block the flow of liquid from one side to the other and thereby maintain the shaft in its last position.

The shaft and piston arrangement is such that the displacement of liquid by the shaft and pistons is constant regardless of the axial position of the shaft and pistons in the cylinder so that any liquid peaks are minimized. Further, the construction of the shaft itself takes the form of first and second sections secured together in a manner to define the reduced diameter portion and the opposing shoulders so that an extremely rugged and reliable support for the pistons themselves is realized. Snap rings secured in grooves and the like to provide stops for the pistons are thus eliminated, the opposed annular shoulders serving this function.

BRIEF DESCRIPTION OF THE DRAWINGS

A better understanding of the invention as well as further improvements and features will be had by referring to a preferred embodiment as shown in the accompanying drawings in which.

DETAILED DESCRIPTION OF THE PREFERRED EMBODIMENT

Figure 1:
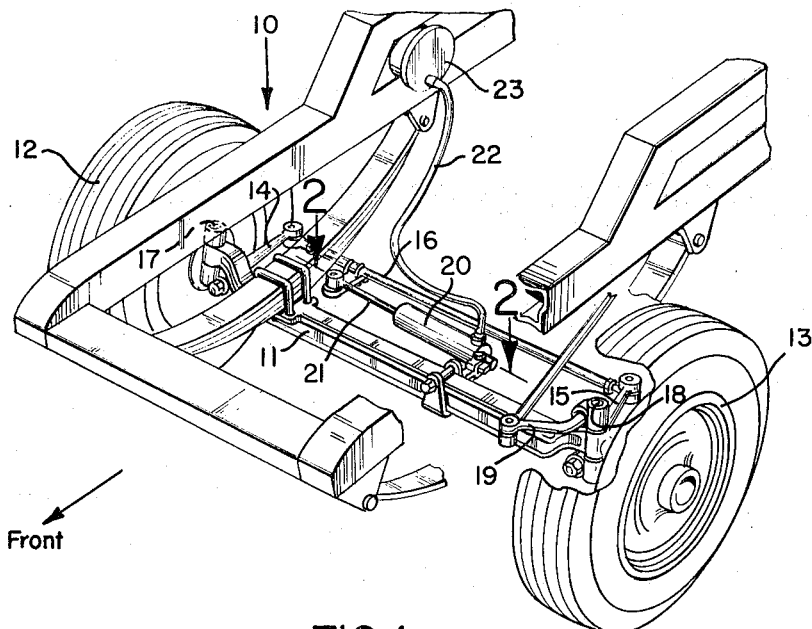
FIG. 1 is a fragmentary perspective view of the front wheels and frame portion of a truck wherein the steering stabilizer of the present invention is mounted.

Referring first to FIG. 1 there is shown the front frame 10 of a vehicle such as a truck. Frame 10 includes axle 11 and front wheels 12 and 13 coupled to the ends of the axle as by steering arms 14 and 15. As shown, the steering arms are interconnected by a steering tie rod 16, the arms themselves being pivoted as by king pins 17 and 18 to the axle 11. Movement of the tie rod 16 is effected through an extension of the steering arm 15 as shown at 19 which extension is coupled to the steering wheel in the driver's cab. When the vehicle is steered, the tie rod 16 is caused to move in a direction generally parallel to the axle 11 to swing the wheels 12 and 13 to the right or left.

In accord with the present invention, there is provided an improved steering stabilizer comprised of a liquid filled cylinder 20 with cooperating shaft means 21 connected between the tie rod 16 and axle 11 of the vehicle. As will become clearer as the description proceeds, the liquid filled cylinder 20 is maintained properly filled with liquid by means of a connection 22 to a liquid reservoir 23 suspended at a level above the cylinder 20.

Figure 2:
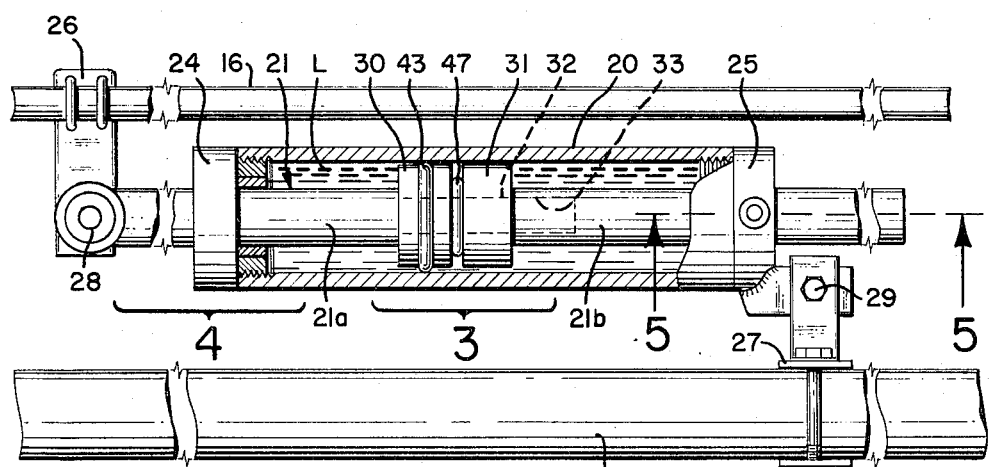
FIG. 2 is an enlarged plan view partly broken away taken in the direction of the arrows 2—2 of FIG. 1.

Referring now to FIG. 2, further details of the steering stabilizer will be evident. Thus, the cylinder 20 includes first and second end caps 24 and 25 through which the shaft means 21 pass in sealing relationship. Securement of the shaft and cylinder to the steering tie rod 16 and axle 11 is accomplished by suitable clamps 26 and 27 pivoted to an extending end of the shaft 21 as at 28 and to the second end cap 25 as at 29, respectively. With this arrangement, sidewise movement of the steering tie rod 16 relative to the axle 11 will result in relative movement between the shaft 21 and cylinder 20.

As shown, the shaft 21 is formed of first and second shaft sections 21a and 21b. First and second pistons 30 and 31 in turn are mounted on a reduced diameter portion indicated by the dashed lines 32 on the end of the first section 21a. This reduced diameter portion fits within a counterbore indicated also by dashed lines in the end of the second shaft section 21b as indicated at 33.

Figure 3:
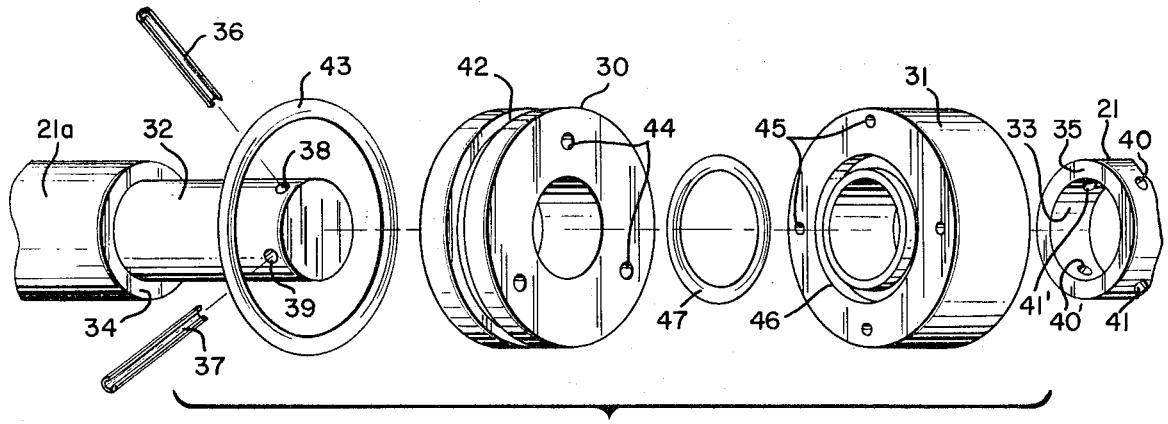
FIG. 3 is an exploded perspective view of the piston assembly encompassed within the bracket 3 of FIG. 2.

Referring specifically to the exploded view of FIG. 3, it will be noted that the reduced diameter portion 32 defines a first annular shoulder 34 on the first shaft section 21a while the counterbored second section defines a second annular shoulder 35 when the reduced diameter end portion is received in the counterbore.

The first and second shaft sections are arranged to be locked together with their annular shoulders in opposing spaced relationship by means of expansion pins 36 and 37 arranged to be received in suitable holes 38 and 39 formed in the reduced diameter portion and registering holes 40, 40' and 41, 41' in the counterbore 33 of the section 21b.

The sum of the axial lengths of the pistons is less than the axial distance between the annular shoulders 34 and 35 when the pistons are assembled so that the pistons can move axially apart to seat respectively on the shoulders in a first position and axially towards each other into face-to-face engagement in a second position.

It will be noted in FIG. 3 that the first piston 30 includes an exterior annular groove 42 receiving an O-ring 43 such that the O-ring will engage the inside wall of the cylinder. This first piston also includes a passage means in the form of radially spaced transverse passages 44 running from one face of the piston to the other in a direction generally parallel to the piston axes.

The second piston 31 is of the same outside diameter as the first piston 30 but because no O-ring is provided, there results an annular clearance with respect to the inner wall of the cylinder 20 as will be evident from FIG. 2. The second piston 31 also includes passage means as indicated radially spaced passages 45 the radial spacing thereof being different from the radial spacing for the passages 44 in the first piston. Spaced radially inwardly of the passages 45 is an annular groove 46 on the opposing face of the piston 31 receiving an O-ring 47 which functions as a biasing means tending to urge the first and second pistons 30 and 31 apart to their first position seated against the annular shoulders of the shaft sections.

The foregoing first position of the pistons is illustrated in solid lines in FIG. 2 and it will be noted that when the cylinder 20 is filled with a liquid L such as any suitable anti-foaming petroleum oil, the liquid can bypass about the pistons by flow through the passages in the pistons and the space between the pistons when in their first positions seated against the annular shoulders.

Figure 4:
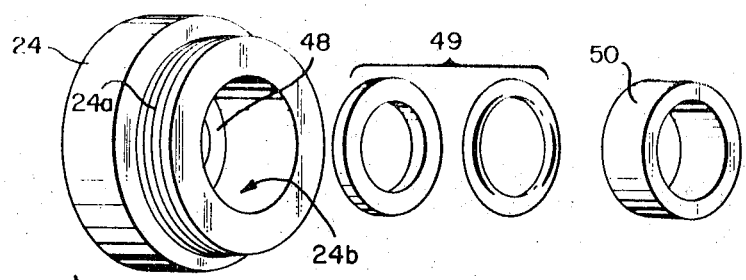
FIG. 4 is an exploded perspective view of one of the end caps and its components encompassed within the bracket 4 of FIG. 2.

Referring now to FIG. 4, the components making up the assembly of the cylinder end cap 24 are shown. Similar components make up the end cap 25 for the opposite end of the cyliner and therefore a description of one will suffice for both.

Thus, the end cap 24 includes a reduced diameter externally threaded portion 24a and a central opening 24b. The central opening includes a reduced diameter bore portion defining an internal annular shoulder 48 facing inwardly. Annular resilient seal means 49 which may include an annular seal and cooperating O-ring are arranged to seat on the shoulder 48 and a bronze ring section 50 force fitted into the opening 24b to thereby sandwich the sealing means against the annular shoulder when the components are assembled.

Referring for the moment back to FIG. 2, it will be noted that the interior ends of the cylinder 20 are threaded for cooperation with the external threads on the end caps, these caps having the same outside diameter as the cylinder to provide a uniform cylindrical assembly. Further, it will be noted that the shaft sections pass through the central openings in the end caps, the bronze ring section 50 serving as a bearing surface and the sealing means 49 assuring a proper liquid seal against fluid escape upon reciprocating movement of the shaft.

Figure 5:
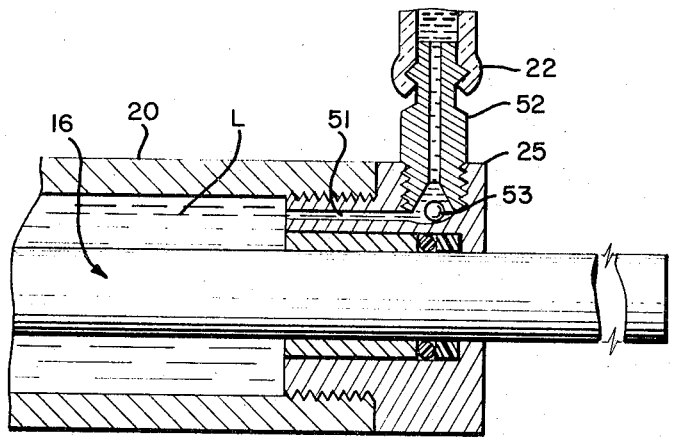
FIG. 5 is a cross-section with central portions shown in full lines taken in the direction of the arrows 5—5 of FIG. 2.

FIG. 5 shows the other end cap 25 with similar components assembled therein to provide a proper bearing support and seal for the shaft means 16. In addition, the end cap 25 includes a passage 51 between the interior of the cylinder and exterior of the end cap together with a cooperating check valve body 52 incorporating a ball 53 functioning as a check valve in the passage 51. This check valve permits liquid flow into the cylinder through the passage but blocks liquid flow in an opposite direction. A connecting tube 22 connects the passage to the liquid reservoir 23 as described in FIG. 1.

Figure 6:
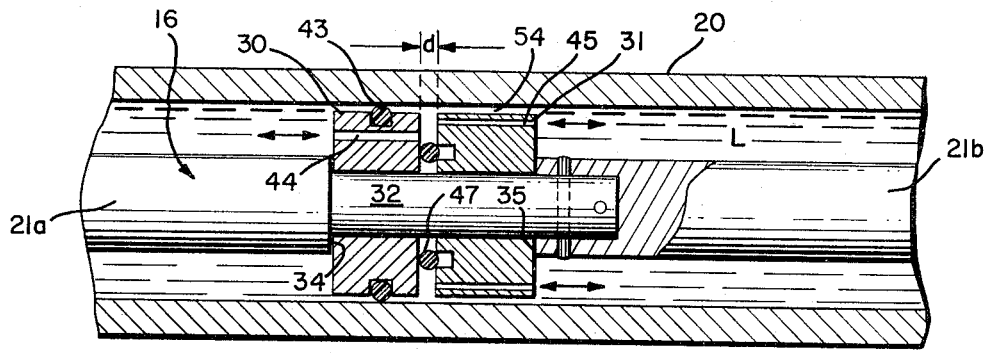
FIG. 6 is a broken-away cross-section of the central portion of the cylinder showing the first and second pistons in a first position such that liquid in the cylinder can pass from one-side to the other; and, FIG. 7 is a view similar to FIG. 6 showing the pistons in a second position in engagement with each other to block flow of liquid from one side to the other under shock conditions.

FIG. 6 illustrates the pistons 30 and 31 in a first position separated from each other in engagement with the opposing annular shoulders 34 and 35 of the shaft sections 21a and 21b. The pistons are normally held in these engaging positions by the O-ring 47 which biases the pistons apart as shown. There is thus a small spacing indicated at d between the opposing faces of the pistons. The small annular clearance between the outside of the second piston 31 and the interior wall of the cylinder 20 is shown at 54 in FIG. 6 and permits the liquid L to bypass the piston 31 and enter into the space between the pistons. In addition, liquid L can pass through the passage means 45 in the second piston 31 into the intervening space. From the intervening space between the pistons, the liquid flow is through the passage means 44 in the first piston 30.

The sum of the cross-sectional areas of the passage means 44 in the first piston 30 is equal to the sum of the cross-sectional areas of the clearance 54 and the passage means 45 in the second piston 31 so that liquid can flow from one-side of the pistons to the other in response to normal movements of the shaft back and forth in the cylinder 20 without undue pressure building up between the opposing faces of the pistons.

Figure 7:
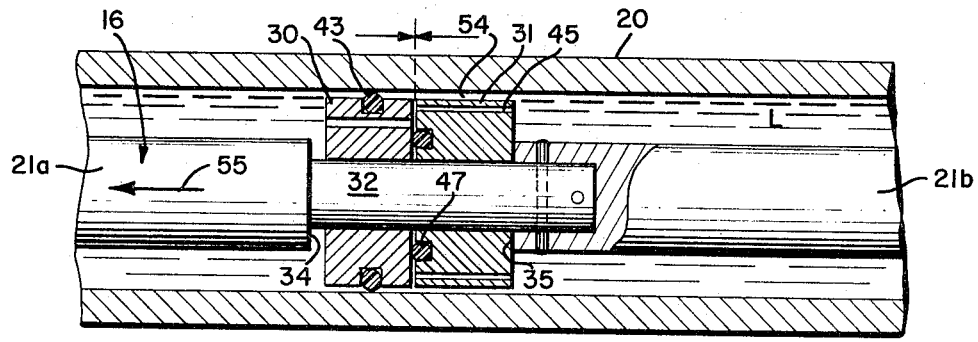

FIG. 7 shows the pistons 30 and 31 in their second position wherein their opposing faces are in surface contact with each other, the O-ring 47 being compressed into its annular groove. This position is a consequence of a sudden relative movement between the cylinder 20 and shaft means 16 wherein the acceleration of this relative movement exceeds a given value as would result in the event of a sudden shock applied to the steering wheels. In FIG. 7, the sudden shock is indicated by the arrow 55 in a direction tending to pull the shaft means 16 to the left, the cylinder 20 being held relative to the truck axle. This sudden accelerated movement is sufficient to overcome the biasing force exerted by the O-ring 47 so that the compression thereof takes place and the opposing faces of the pistons are brought into surface engagement thereby completely blocking flow of liquid through the respective passage means.

OPERATION

The operation of the steering stabilizer will be evident from the foregoin description. With the cylinder 20 filled with fluid and secured between the steering tie rod and vehicle axle portion of the frame, normal steering can be carried out. Thus, the pistons as shown in FIG. 6 will be in their first positions so that liquid can bypass the pistons from one-side to the other as described.

In the event the steering wheels of the vehicle should engage an obstruction such as a curb which would tend to cause a sudden swiveling of the wheels, the initial shock is immediately imparted as a relative movement between the shaft 16 and cylinder 20 of the stabilizing device. This movement exceeds a given acceleration level sufficient to result in the pistons 30 and 31 immediately moving into face-to-face engagment as shown in FIG. 7 thereby blocking the flow of liquid from one-side to the other so that the shaft 16 is essentially maintained in its last position. The vehicle wheels are thus stabilized against undue swiveling.

Upon ending of the shock or sudden relative movements, the pistons will immediately separate as a consequence of the resiliency of the O-ring 47 so that normal liquid flow through the piston passages can take place and steering can be continued in a normal manner.

An important feature of this invention resides in the provision of a shaft means supporting the pistons which extends through both ends of the cylinder. It will be evident that as a consequence of this arrangement, the displacement of liquid in the cylinder by the shaft means and the pistons is constant for all positions of the shaft and pistons within the cylinder. As a result, the tendency for liquid to leak from the cylinder is minimized.

The foregoing construction is important when compared to a piston with a single piston rod extending from only one end of a cylinder. In this latter arrangement, as the piston moves further into the cylinder, liquid is displaced further resulting in either an increase in the liquid pressure or a leaking of the liquid from the cylinder. In other words, the volume of liquid displaced increases when a single ended piston rod moves into the cylinder.

Over long periods, there may, of course, be some loss of liquid from the cylinder 20. However, in view of the provision of the liquid reservoir and connection to the associated check valve on the end cap 25 as described in FIG. 5, the cylinder 20 is at all times maintained completely filled with liquid so that reliable action is assured. In this respect, the liquid from the reservoir is simply gravity fed to the cylinder, the reservoir itself always being disposed at a higher level than the cylinder.

Finally, the provision of the shaft means in the form of two sections wherein a reduced diameter portion defines opposing shoulders results in a very reliable mounting for the pistons themselves. Heretofore, snap rings fitted within grooves have been often relied upon for confining motion of the pistons and these are subject to breakage. The annular shoulders on the other hand provide an extremely rugged and reliable stop means for limiting the travel of the pistons on the reduced diameter portion so that consistent and reliable action is assured.

From the foregoing description, it will accordingly be evident that the present invention has provided a greatly improved steering stabilizer.

What is claimed is:

1. A steering stabilizer for connection between a front wheel axle and the steering rod of a vehicle comprising, in combination:
   a. a cylinder having first and second end caps with central openings;
   b. a shaft comprised of first and second sections passing into opposite ends of said cylinder through the central openings in said end caps respectively, the inner end of the first shaft section having a reduced diameter portion defining a first annular shoulder, the inner end of the second shaft section having a counterbore dimensioned to receive the end of said reduced diameter portion to define a second annular shoulder opposing said first annular shoulder in spaced relationship;
   c. first and second pistons mounted on said reduced diameter portion between said first and second shoulders in axial alignment with each other, the axial length of the pistons being less than the actual distance between the shoulders so that the pistons can move axially apart to seat respectively on said shoulders in a first position and axially towards each other into face-to-face engagement in a second position,
   said pistons including passage means respectively radially spaced different distances from their axes so that the passage means are eclipsed when the pistons are in their second position and are clear when in their first position, said second piston including an annular groove in its face opposed to the face of the first piston within the radial distance of its passage means;
   d. biasing means between the opposed faces of said pistons urging them apart to said first position, said biasing means comprising an O-ring in said annular groove, said O-ring being compressed completely into said groove when said pistons are in their second position so that their opposed faces are in full surface contact; and,
   e. a liquid filling said cylinder, the volume of liquid displaced in said cylinder by the shaft means and first and second pistons being constant for all axial positions of the shaft means and pistons in said cylinder between said end caps so that said shaft means and pistons can move back and forth in the cylinder to follow normal movements of the steering rod relative to the axle, said liquid passing from one side of the pistons to the other through said passage means and the separation space defined between the pistons when in their first position, any sudden shock applied to the steering rod tending to accelerate relative movement between the shaft means and cylinder in one direction or the other in excess of a given acceleration, causing said pistons to move to their second position to close off said passage means and block liquid flow therethrough so that the shaft means is held in its last axial position to thereby stabilize the steering rod and wheels of the vehicle against unintended sudden movement as a result of said shock.

2. A stabilizer according to claim 1, in which said reduced diameter end portion of said first section of the shaft means is secured in said counterbore of the second section of the shaft means by two pins axially spaced less than the axial depth of the counterbore passing transversely through the reduced diameter portion of the first shaft section and counterbored end of the second shaft section at right angles to each other.

3. A stabilizer according to claim 1, in which the ends of said cylinder are internally threaded, said end caps being of the same outside diameter as said cylinder and including exteriorly threaded reduced diameter portions threadedly received in the ends of the cylinder so that a cylindrical assembly of uniform outside diameter results.

4. A stabilizer according to claim 1, in which the central opening in each end cap includes a reduced diameter bore portion defining an internal annular shoulder facing inwardly; annular resilient seal means seated on said shoulder; and a bronze ring section force-fitted into the inner end of the opening to sandwich the seal means in place and provide a bearing surface for said shaft means.

5. A stabilizer according to claim 1, in which one of said end caps includes a passage between the interior of the cylinder and exterior of the end cap; a check valve in said passage permitting liquid flow into said cylinder through said passage and blocking liquid flow in an opposite direction; and a reservoir of liquid disposed at a level above the cylinder and connected to said passage so that liquid is gravity fed to said cylinder assuring that the cylinder is at all times filled with liquid.

* * * * *